(12) United States Patent
Wei

(10) Patent No.: US 10,438,321 B2
(45) Date of Patent: *Oct. 8, 2019

(54) IMAGE PROCESSING METHOD AND APPARATUS, AND ELECTRONIC DEVICE

(71) Applicant: GUANGDONG OPPO MOBILE TELECOMMUNICATIONS CORP., LTD., Dongguan (CN)

(72) Inventor: Yi Wei, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 113 days.

This patent is subject to a terminal disclaimer.

(21) Appl. No.: 15/803,521

(22) Filed: Nov. 3, 2017

(65) Prior Publication Data

US 2018/0150938 A1 May 31, 2018

(30) Foreign Application Priority Data

Nov. 29, 2016 (CN) .......................... 2016 1 1099894

(51) Int. Cl.
*G06K 9/40* (2006.01)
*G06T 3/40* (2006.01)
(Continued)

(52) U.S. Cl.
CPC .......... *G06T 3/4015* (2013.01); *G06T 3/4007* (2013.01); *G06T 5/003* (2013.01);
(Continued)

(58) Field of Classification Search
CPC ..... G06T 3/4015; G06T 5/003; G06T 3/4007; G06T 7/11; G06T 2207/20;
(Continued)

(56) References Cited

U.S. PATENT DOCUMENTS 8,248,496 B2 8/2012 Sekine
10,109,038 B2 * 10/2018 Wei .................... H04N 5/37457
(Continued)

FOREIGN PATENT DOCUMENTS

CN 101472048 A 7/2009
CN 104580925 A 4/2015
(Continued)

OTHER PUBLICATIONS

PCT/CN2017/081919 International Search Report and Written Opinion dated Jun. 28, 2017, 12 pages.
(Continued)

*Primary Examiner* — Andrew M Moyer
(74) *Attorney, Agent, or Firm* — Lathrop Gage LLP

(57) ABSTRACT

An image processing method is provided. The image processing method is configured to process the color-block image output by the image sensor. The brightness area is identified in the color-block image. A first part of the color-block image within the brightness area is converted into a first image using a first interpolation algorithm. The second part of the color-block image beyond the brightness area is converted into a second image using a second interpolation algorithm. The first image and the second image are merged to generate a simulation image corresponding to the color-block image. Moreover, an image processing apparatus and an electronic device are provided.

18 Claims, 16 Drawing Sheets

(51) Int. Cl.
*G06T 7/11* (2017.01)
*G06T 5/00* (2006.01)
*H04N 9/73* (2006.01)
*H04N 5/347* (2011.01)
*H04N 9/04* (2006.01)
*H04N 5/3745* (2011.01)
*H04N 5/217* (2011.01)
*H04N 5/367* (2011.01)

(52) U.S. Cl.
CPC ............... *G06T 7/11* (2017.01); *H04N 5/217* (2013.01); *H04N 5/347* (2013.01); *H04N 5/367* (2013.01); *H04N 5/37457* (2013.01); *H04N 9/045* (2013.01); *H04N 9/04511* (2018.08); *H04N 9/04515* (2018.08); *H04N 9/735* (2013.01); *G06T 2207/20* (2013.01)

(58) Field of Classification Search
CPC ........... H04N 9/04511; H04N 9/04515; H04N 5/367; H04N 5/217; H04N 5/37457; H04N 9/045; H04N 5/347; H04N 9/735
USPC ........................................................ 382/263
See application file for complete search history.

(56) References Cited

U.S. PATENT DOCUMENTS

| 2008/0062290 | A1 | 3/2008 | Lahav et al. |
| 2009/0200451 | A1* | 8/2009 | Conners ............... H04N 5/2351 250/208.1 |
| 2011/0031418 | A1* | 2/2011 | Shcherback ............. G01J 1/04 250/559.29 |
| 2011/0199512 | A1* | 8/2011 | Chen ...................... G06F 21/74 348/231.99 |
| 2011/0234842 | A1* | 9/2011 | Ishiga .................... H04N 5/367 348/223.1 |
| 2013/0051665 | A1 | 2/2013 | Shinozaki |
| 2014/0211060 | A1* | 7/2014 | Funao .................. G06T 3/4015 348/311 |

FOREIGN PATENT DOCUMENTS

| CN | 105573522 A | 5/2016 |
| CN | 105611258 A | 5/2016 |
| CN | 106488203 A | 3/2017 |

OTHER PUBLICATIONS

European Patent Application No. 17199640.8 extended Search and Opinion dated Apr. 20, 2018, 7 pages.

* cited by examiner

Merged image

| R | R | Gr | Gr |
|---|---|----|----|
| R | R | Gr | Gr |
| Gb | Gb | B | B |
| Gb | Gb | B | B | color-block image

Fig. 8

IMAGE PROCESSING METHOD AND APPARATUS, AND ELECTRONIC DEVICE

CROSS-REFERENCE TO RELATED APPLICATIONS

This application is based on and claims priority of Chinese Patent Application No. 201611099894.X, filed on Nov. 29, 2016, the entire contents of which are incorporated herein by reference.

FIELD

The present disclosure relates to the imaging technology field, and more particularly to an image processing method, an image processing apparatus, and an electronic device.

BACKGROUND

When an image is processed using a conventional image processing method, either the obtained image has a low resolution, or it takes a long time and too many resources to obtain an image with high resolution, both of which are inconvenient for users.

DISCLOSURE

The present disclosure aims to solve at least one of existing problems in the related art to at least some extent. Accordingly, the present disclosure provides an image processing method, an image processing apparatus, and an electronic device.

Embodiments of the present disclosure provide an image processing method. The image processing method is configured to process a color-block image output by an image sensor. The image sensor includes an array of photosensitive pixel units. Each photosensitive pixel unit includes a plurality of photosensitive pixels. The color-block image includes image pixel units arranged in a preset array. Each image pixel unit includes a plurality of original pixels. Each photosensitive pixel unit corresponds to one image pixel unit, and each photosensitive pixel corresponds to one original pixel. The image processing method includes: identifying a brightness area in the color-block image; converting a first part of the color-block image within the brightness area into a first image using a first interpolation algorithm, in which, the first image includes first simulation pixels arranged in an array, and each photosensitive pixel corresponds to one first simulation pixel; converting a second part of the color-block image beyond the brightness area into a second image using a second interpolation algorithm, in which, the second image includes second simulation pixels arranged in an array, each photosensitive pixel corresponds to one second simulation pixel, and a complexity of the first interpolation algorithm is greater than that of the second interpolation algorithm; and merging the first image and the second image to generate a simulation image corresponding to the color-block image.

Embodiments of the present disclosure further provide an image processing apparatus. The image processing apparatus is configured to process a color-block image output by an image sensor. The image sensor includes an array of photosensitive pixel units. Each photosensitive pixel unit includes a plurality of photosensitive pixels. The color-block image includes image pixel units arranged in a preset array. Each image pixel unit includes a plurality of original pixels. Each photosensitive pixel unit corresponds to one image pixel unit, and each photosensitive pixel corresponds to one original pixel. The image processing apparatus includes a non-transitory computer-readable medium including computer-readable instructions stored thereon, and an instruction execution system which is configured by the instructions to implement at least one of an identifying module, a first converting module, a second converting module and a merging module. The identifying module is configured to identify a brightness area in the color-block image. The first converting module is configured to convert a first part of the color-block image within the brightness area into a first image using a first interpolation algorithm, in which, the first image includes first simulation pixels arranged in an array, and each photosensitive pixel corresponds to one first simulation pixel. The second converting module is configured to convert a second part of the color-block image beyond the brightness area into a second image using a second interpolation algorithm, in which, the second image includes second simulation pixels arranged in an array, each photosensitive pixel corresponds to one second simulation pixel, and a complexity of the first interpolation algorithm is greater than that of the second interpolation algorithm. The merging module is configured to merge the first image and the second image to generate a simulation image corresponding to the color-block image.

Embodiments of the present disclosure provide an electronic device. The electronic device includes a housing, a processor, a memory, a circuit board, a power supply circuit, and an imaging apparatus. The circuit board is enclosed by the housing. The processor and the memory are positioned on the circuit board. The power supply circuit is configured to provide power for respective circuits or components of the electronic device. The imaging apparatus includes an image sensor. The image sensor is configured to output a color-block image. The image sensor includes an array of photosensitive pixel units. Each photosensitive pixel unit includes a plurality of photosensitive pixels. The color-block image includes image pixel units arranged in a preset array. Each image pixel unit includes a plurality of original pixels. Each photosensitive pixel unit corresponds to one image pixel unit, and each photosensitive pixel corresponds to one original pixel. The memory is configured to store executable program codes. The processor is configured to run a program corresponding to the executable program codes by reading the executable program codes stored in the memory, to perform the image processing method according to embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

FIG. 8 is a schematic diagram of a color-block image according to an embodiment of the present disclosure.

EMBODIMENTS OF THE PRESENT DISCLOSURE

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

In the related art, an image sensor includes an array of photosensitive pixel units and an array of filter units arranged on the array of photosensitive pixel unit. Each filter unit corresponds to and covers one photosensitive pixel unit, and each photosensitive pixel unit includes a plurality of photosensitive pixels. When working, the image sensor is controlled to be exposed to light to output a merged image. The merged image includes an array of merged pixels, and a plurality of photosensitive pixels in a same photosensitive pixel unit are collectively outputted as one merged pixel. Thus, a signal-to-noise ratio of the merge image is increased. However, a resolution of the merged image is reduced.

Certainly, the image sensor can be controlled to output a color-block image with a high amount of pixels, which includes an array of original pixels, and each photosensitive pixel corresponds to one original pixel. However, since a plurality of original pixels corresponding to a same filter unit have the same color, the resolution of the color-block image still cannot be increased. Thus, the color-block image with the high number of pixels needs to be converted into a simulation image with a high amount of pixels by an interpolation algorithm, in which the simulation image includes a Bayer array of simulation pixels. Then, the simulation image can be converted into a simulation true-color image by an image processing method and saved. The resolution of the true-color image may be improved by using the interpolation algorithm. However, the interpolation algorithm consumes resource and time, thereby taking a long time to capture pictures and making user experience poor. Furthermore, not all of applications need to be processed with the interpolation algorithm or need to output the simulation true-color image.

Figure 1:
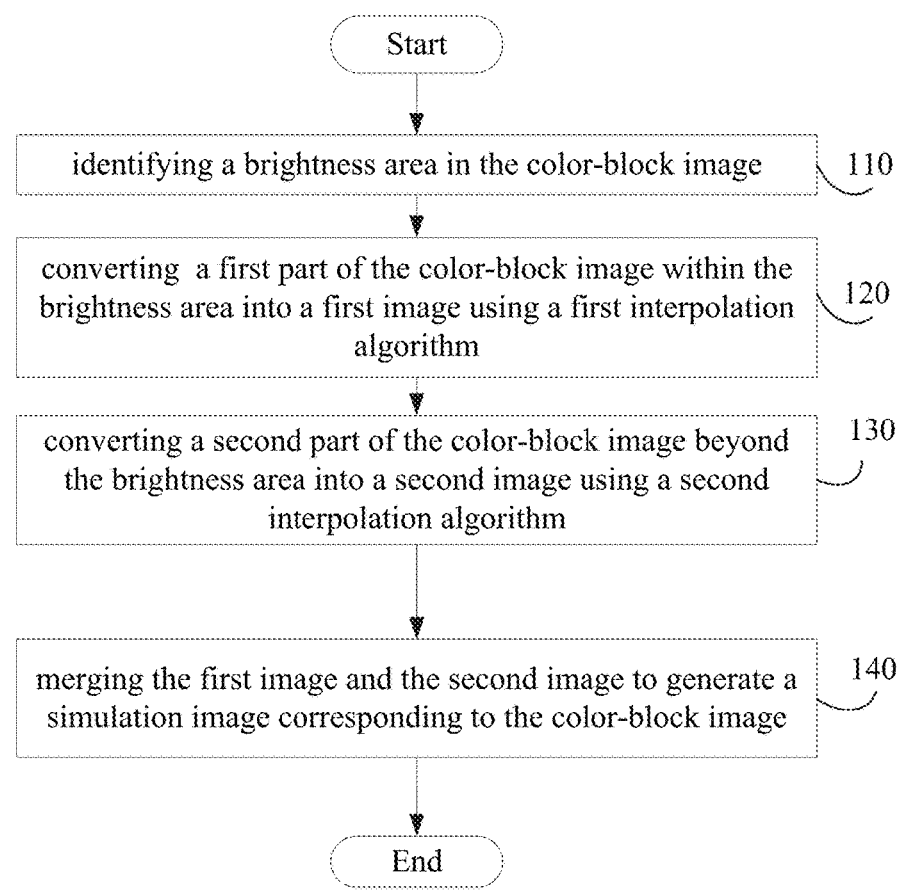
FIG. 1 is a flow chart of an image processing method according to an embodiment of the present disclosure.
Figure 2:
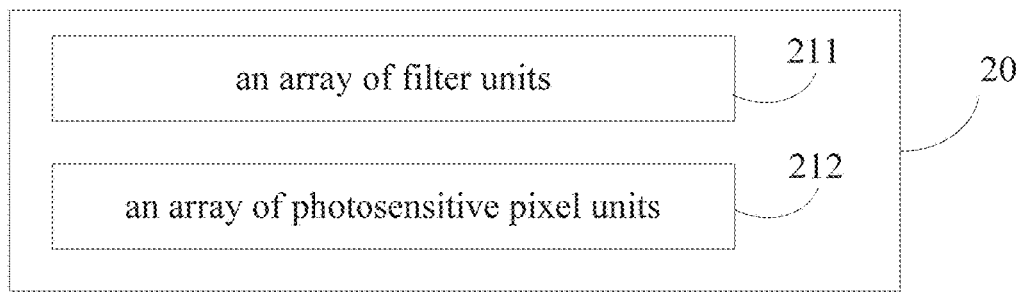
FIG. 2 is a block diagram of an image sensor according to an embodiment of the present disclosure.
Figure 3:
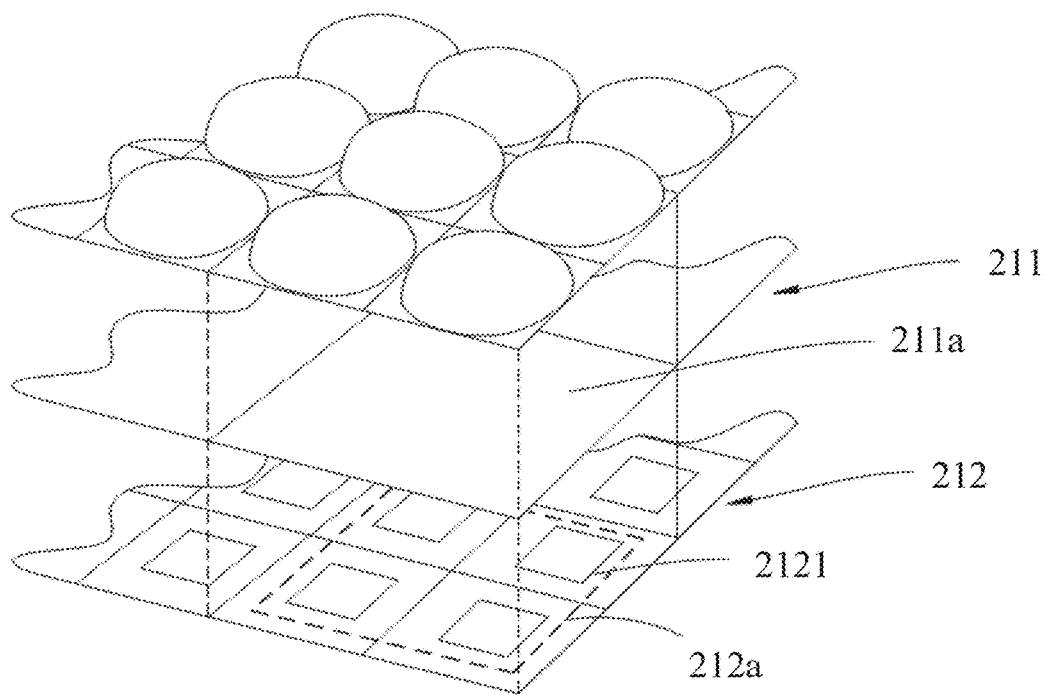
FIG. 3 is a schematic diagram of an image sensor according to an embodiment of the present disclosure.

Thus, embodiments of the present disclosure provide a novel image processing method. Referring to FIG. 1, an image processing method is illustrated. The image processing method is configured to process a color-block image output by an image sensor to obtain a simulation image. The image processing method is applied in an electronic device. As illustrated in FIGS. 2 and 3, the image sensor 20 includes an array 212 of photosensitive pixel units and an array 211 of filter units arranged on the array 212 of photosensitive pixel units. The array 211 of filter units includes a plurality of filter units 211a, and the array 212 of photosensitive pixel units includes a plurality of photosensitive pixel units 212a. Each filter unit 211a corresponds to and covers one photosensitive pixel unit 212a, and each photosensitive pixel unit 212a includes a plurality of photosensitive pixels 2121 adjacent to each other. The color-block image includes image pixel units arranged in a preset array. Each image pixel unit includes a plurality of original pixels. Each photosensitive pixel unit 212a corresponds to one image pixel unit, and each photosensitive pixel 2121 corresponds to one original pixel. The image processing method includes the following.

At block 110, a brightness area is identified in the color-block image.

At block 120, a first part of the color-block image within the brightness area is converted into a first image using a first interpolation algorithm.

The first image includes first simulation pixels arranged in an array, and each photosensitive pixel corresponds to one first simulation pixel.

At block 130, a second part of the color-block image beyond the high-brightness area is converted into a second image using a second interpolation algorithm.

The second image includes second simulation pixels arranged in an array, and each photosensitive pixel corresponds to one second simulation pixel.

The first interpolation algorithm is more complex than the second interpolation algorithm.

At block 140, the first image and the second image are merged to generate a simulation image corresponding to the color-block image.

With the image processing method according to embodiments of the present disclosure, by identifying the high-brightness area and processing the high-brightness area of the color-block image using the first interpolation algorithm, a high quality image can be obtained and a situation that it takes too much work to process the whole frame of image using the first interpolation algorithm can be avoided, thus improving work efficiency.

For the area with high brightness, distinguishability of the image within the high-brightness area can be improved by processing the area using the first interpolation algorithm. For the area with low brightness, since the noise in the area is high, the benefit of improving the distinguishability of the image using the first interpolation algorithm is not obvious. Further, the complexity of the first interpolation algorithm includes the time complexity and the space complexity, which are greater than those of the second interpolation algorithm. Therefore, it is advantageous to process the area with high brightness using the first interpolation algorithm and process the area with low brightness using the second interpolation algorithm with complexity less than that of the first interpolation algorithm. Not only the quality of image can be improved, but also the time required for processing data and image can be reduced, thus improving the user experience.

Figure 4:
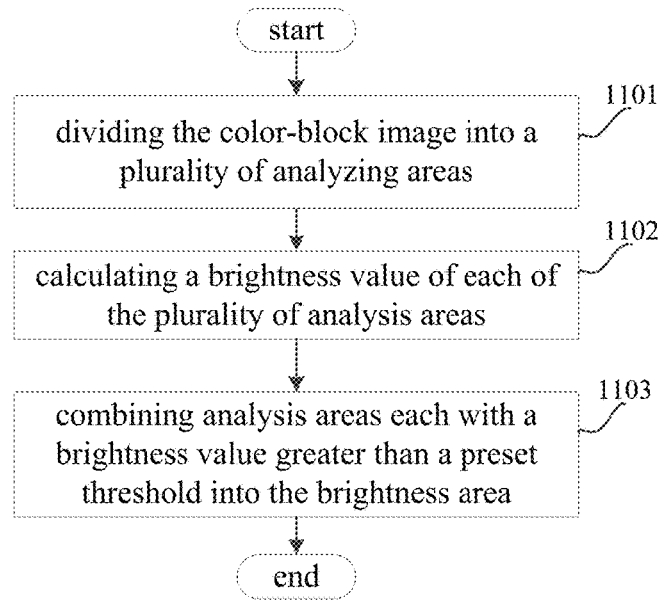
FIG. 4 is a flow chart illustrating a process of identifying a brightness area in the color-block image according to an embodiment of the present disclosure.

Referring to FIG. 4, in some implementations, the act at block 110 includes the following.

At block 1101, the color-block image is divided into a plurality of analysis areas.

In some embodiments, the plurality of analysis areas are arranged in an array.

At block 1102, a brightness value of each of the plurality of analysis areas is calculated.

At block 1103, analysis areas each with a brightness value greater than a preset threshold are combined into the brightness area.

In some implementations, the color-block image is divided into M*N analysis areas. The brightness value is calculated for each of the M*N analysis areas. For each analysis area, the brightness value is compared with the preset threshold. When the brightness value is greater than the preset threshold, the corresponding analysis area having the brightness value can be considered as being in the brightness area. During an imaging process, the part within the brightness area may be processed with the first interpolation algorithm to obtain an image with a high quality.

In some implementations, each analysis area includes one or more original pixels.

It can be understood that, in some implementations, each original pixel of the color-block image may be considered as one analysis area, i.e., the brightness value of each original pixel is compared with the preset threshold. The original pixels with the brightness value greater than the preset threshold are combined as being in the brightness area. The part of the color-image in the brightness area is processed with the first interpolation algorithm to obtain a high quality image.

Figure 5:
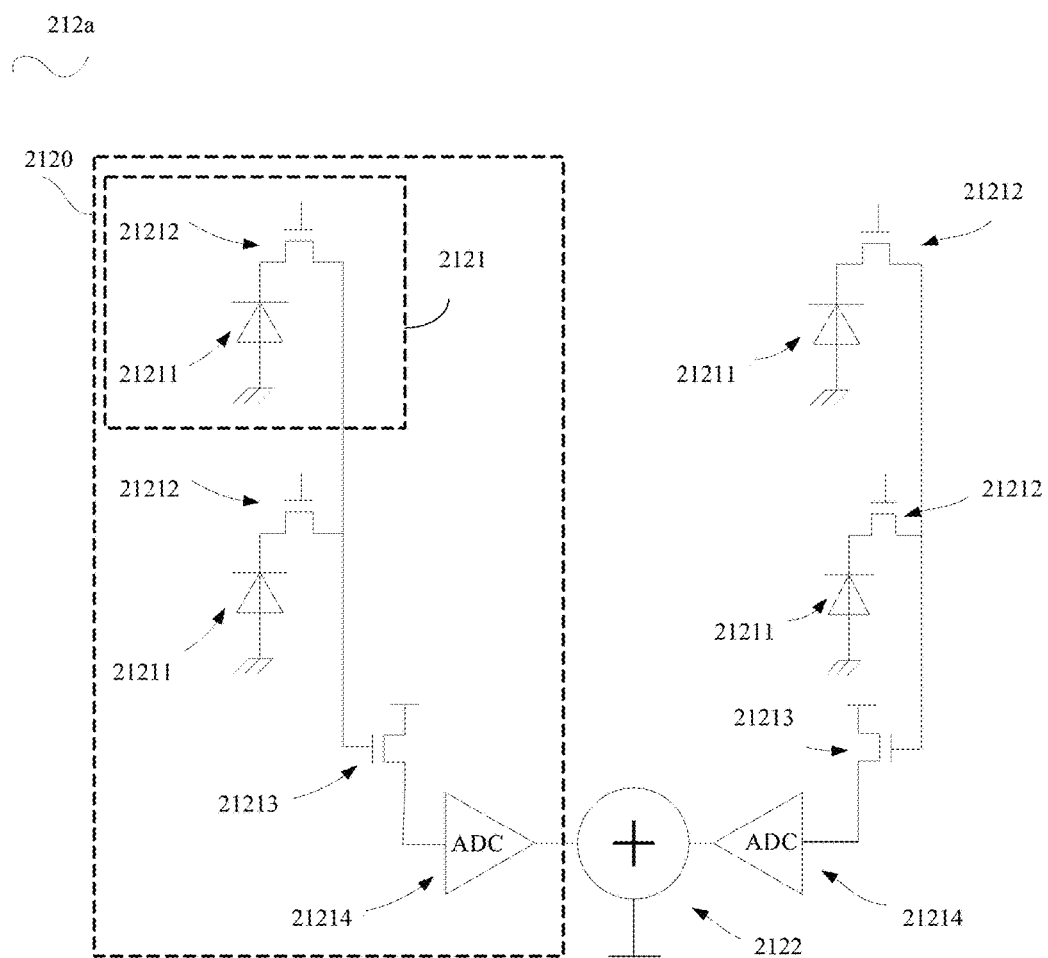
FIG. 5 is a schematic diagram illustrating a circuit of an image sensor according to an embodiment of the present disclosure.
Figure 6:
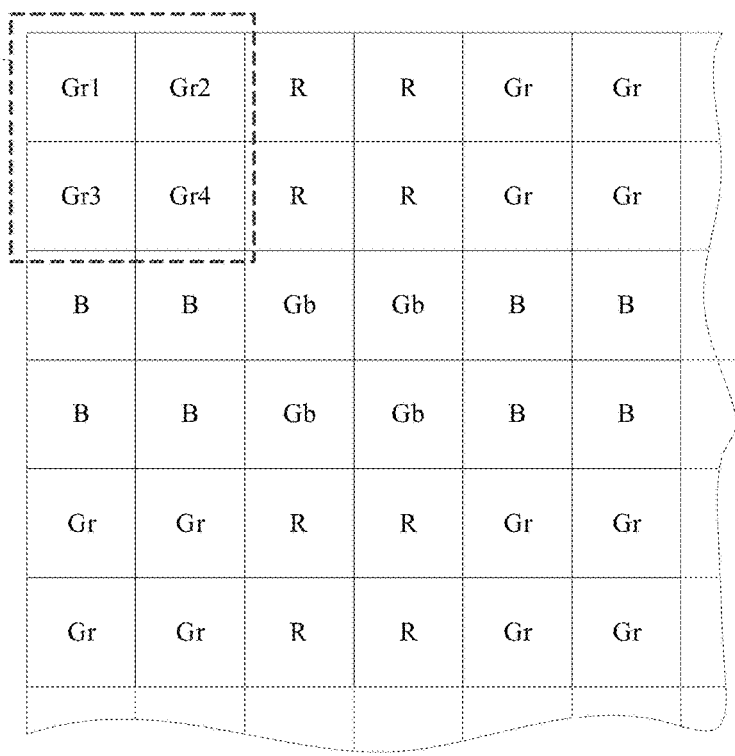
FIG. 6 is a schematic diagram of an array of filter units according to an embodiment of the present disclosure.

FIG. 5 is a schematic diagram illustrating a circuit of an image sensor according to an embodiment of the present disclosure. FIG. 6 is a schematic diagram of an array of filter units according to an embodiment of the present disclosure. FIGS. 2-3 and 5-6 are better viewed together.

Referring to FIGS. 2-3 and 5-6, the image sensor 20 according to an embodiment of the present disclosure includes an array 212 of photosensitive pixel units and an array 211 of filter units arranged on the array 212 of photosensitive pixel units.

Further, the array 212 of photosensitive pixel units includes a plurality of photosensitive pixel units 212a. Each photosensitive pixel unit 212a includes a plurality of adjacent photosensitive pixels 2121. Each photosensitive pixel 2121 includes a photosensitive element 21211 and a transmission tube 21212. The photosensitive element 21211 may be a photodiode, and the transmission tube 21212 may be a MOS transistor.

The array 211 of filter units includes a plurality of filter units 211a. Each filter unit 211a corresponds to one photosensitive pixel unit 212a.

In detail, in some examples, the filter units 211a are arranged in a Bayer array. In other words, four adjacent filter units 211a include one red filter unit, one blue filter unit and two green filter units.

Each photosensitive pixel unit 212a corresponds to a filter unit 211a with a same color. If a photosensitive pixel unit 212a includes n adjacent photosensitive elements 21211, one filter unit 211a covers n photosensitive elements 21211 in one photosensitive pixel unit 212a. The filter unit 211a may be formed integrally, or may be formed by assembling n separate sub filters.

In some implementations, each photosensitive pixel unit 212a includes four adjacent photosensitive pixels 2121. Two adjacent photosensitive pixels 2121 collectively form one photosensitive pixel subunit 2120. The photosensitive pixel subunit 2120 further includes a source follower 21213 and an analog-to-digital converter 21214. The photosensitive pixel unit 212a further includes an adder 2122. A first electrode of each transmission tube 21212 in the photosensitive pixel subunit 2120 is coupled to a cathode electrode of a corresponding photosensitive element 21211. Second electrodes of all the transmission tubes 21212 are collectively coupled to a gate electrode of the source follower 21213 and coupled to an analog-to-digital converter 21214 through the source electrode of the source follower 21213. The source follower 21213 may be a MOS transistor. Two photosensitive pixel subunits 2120 are coupled to the adder 2122 through respective source followers 21213 and respective analog-to-digital converters 21214.

In other words, four adjacent photosensitive elements 21211 in one photosensitive pixel unit 212a of the image sensor 20 according to an embodiment of the present disclosure collectively use one filter unit 211a with a same color as the photosensitive pixel unit 212a. Each photosensitive element 21211 is coupled to a transmission tube 21212 correspondingly. Two adjacent photosensitive elements 21211 collectively use one source follower 21213 and one analog-digital converter 21214. Four adjacent photosensitive elements 21211 collectively use one adder 2122.

Further, four adjacent photosensitive elements 21211 are arranged in a 2-by-2 array. Two photosensitive elements 21211 in one photosensitive pixel subunit 2120 can be in a same row.

During an imaging process, when two photosensitive pixel subunits 2120 or four photosensitive elements 21211 covered by a same filter unit 211a are exposed to light simultaneously, pixels can be merged, and the merged image can be outputted.

In detail, the photosensitive element 2121 is configured to convert light into charges, and the amount of the charges is proportional to an illumination intensity. The transmission tube 21212 is configured to control a circuit to turn on or off according to a control signal. When the circuit is turned on, the source follower 21213 is configured to convert the charges generated through light illumination into a voltage signal. The analog-to-digital converter 21214 is configured to convert the voltage signal into a digital signal. The adder 2122 is configured to add two digital signals for outputting and processing.

Figure 7:
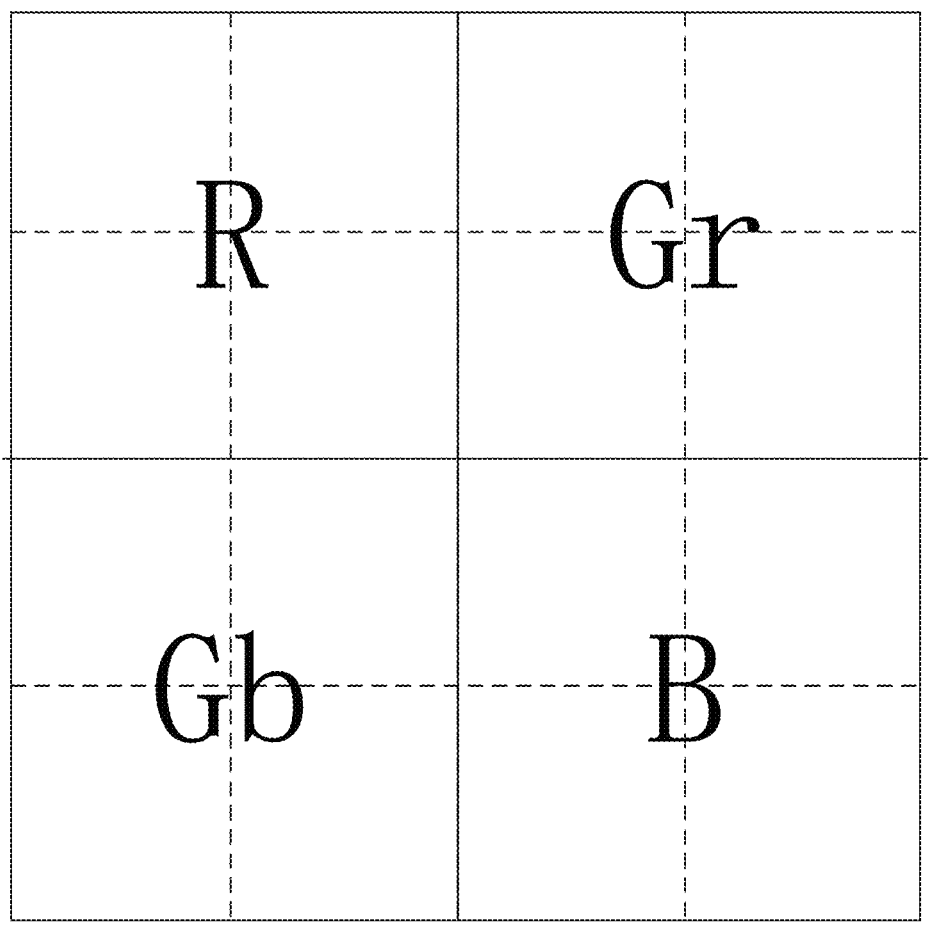
FIG. 7 is a schematic diagram of a merged image according to an embodiment of the present disclosure.

Referring to FIG. 7, take an image sensor 20 of 16M as an example. The image sensor 20 according to an embodiment of the present disclosure can merge photosensitive pixels of 16M into photosensitive pixels of 4M, i.e., the image sensor 20 outputs the merged image. After the merging, the photosensitive pixel 2121 quadruples in size, such that the photo-sensibility of the photosensitive pixel 2121 is increased. In addition, since most part of noise in the image sensor 20 is random, there may be noise points at one or two pixels. After four photosensitive pixels 2121 are merged into a big photosensitive pixel, an effect of noise points on the big photosensitive pixel is reduced, i.e., the noise is weakened and SNR (signal to noise ratio) is improved.

However, when the size of the photosensitive pixel is increased, the pixel value is decreased, and thus the resolution of the merged image is decreased.

During an imaging process, when four photosensitive elements 21211 covered by a same filter unit 211*a* are exposed to light in sequence, a color-block image may be output after an image processing.

In detail, the photosensitive element 21211 is configured to convert light into charges, and the amount of charges is proportional to an illumination intensity. The transmission tube 21212 is configured to control a circuit to turn on or off according to a control signal. When the circuit is turned on, the source follower 21213 is configured to convert the charges generated by the photosensitive element 21211 under light illumination into a voltage signal. The analog-to-digital converter 21214 is configured to convert the voltage signal into a digital signal for processing.

Referring to FIG. 8, take an image sensor 20 of 16M as an example. The image sensor 20 according to an embodiment of the present disclosure can output photosensitive pixels of 16M, i.e., the image sensor 20 outputs the color-block image. The color-block image includes image pixel units. The image pixel unit includes original pixels arranged in a 2-by-2 array. The size of the original pixel is the same as that of the photosensitive pixel 2121. However, since a filter unit 211*a* covering four adjacent photosensitive elements 21211 has a same color (i.e., although four photosensitive elements 21211 are exposed to light respectively, the filter unit 211*a* covering the four photosensitive elements 21211 has a same color), four adjacent original pixels in each image pixel unit of the output image have a same color, and thus the resolution of the image cannot be increased.

The image processing method according to an embodiment of the present disclosure is able to process the color-block image to obtain a simulation image.

It some embodiments, when a merged image is output, four adjacent photosensitive pixels 2121 with the same color can be output as one merged pixel. Accordingly, four adjacent merged pixels in the merged image can be considered as being arranged in a typical Bayer array, and can be processed directly to output a merged true-color image. When a color-block image is output, each photosensitive pixel 2121 is output separately. Since four adjacent photosensitive pixels 2121 have a same color, four adjacent original pixels in an image pixel unit have a same color, which form an untypical Bayer array. However, the untypical Bayer array cannot be directly processed. In other words, when the image sensor 20 adopts a same apparatus for processing the image, in order to realize a compatibility of the true-color image outputs under two modes (i.e., the merged true-color image under a merged mode and the simulation true-color image under a color-block mode), it is required to convert the color-block image into the simulation image, or to convert the image pixel unit in an untypical Bayer array into pixels arranged in the typical Bayer array.

The simulation image includes simulation pixels arranged in the Bayer array. Each photosensitive pixel corresponds to one simulation pixel. One simulation pixel in the simulation image corresponds to an original pixel located at the same position as the simulation pixel in the color-block image.

Figure 9:
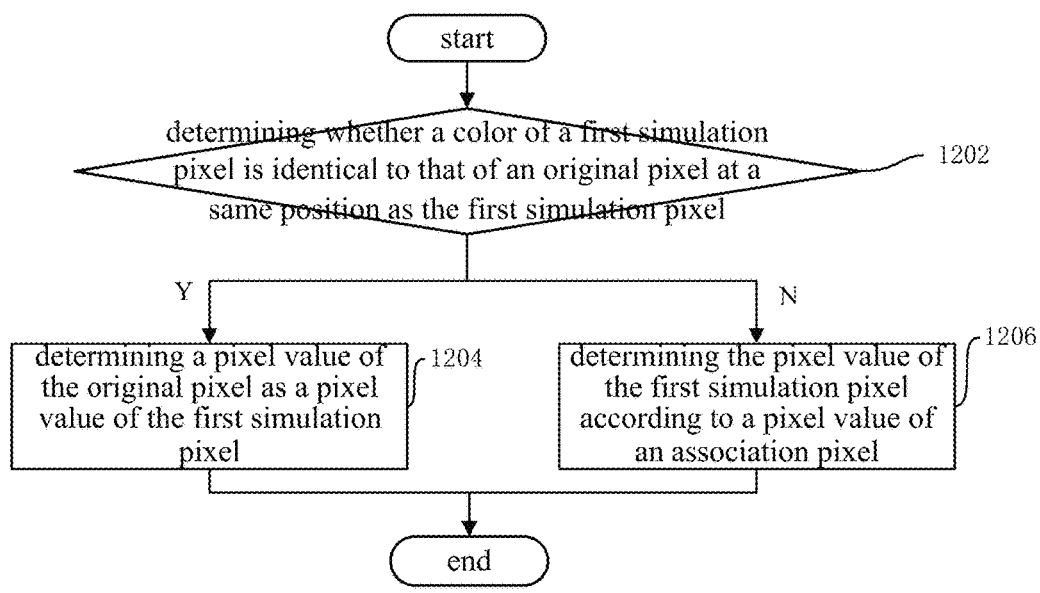
FIG. 9 is a flow chart illustrating a process of converting a part of the color-block image into a first image according to an embodiment of the present disclosure.

Referring to FIG. 9, in some implementations, the act at block 120 (converting the first part of the color-block image into the first image using the first interpolation algorithm) includes the following.

At block 1202, it is determined whether a color of a first simulation pixel is identical to that of an original pixel at a same position as the first simulation pixel, if yes, an act at block 1204 is executed, otherwise, an act at block 1206 is executed.

At block 1204, a pixel value of the original pixel is determined as a pixel value of the first simulation pixel.

At block 1206, the pixel value of the first simulation pixel is determined according to a pixel value of an association pixel.

The association pixel is selected from an image pixel unit with a same color as the first simulation pixel and adjacent to an image pixel unit including the original pixel.

Figure 10:
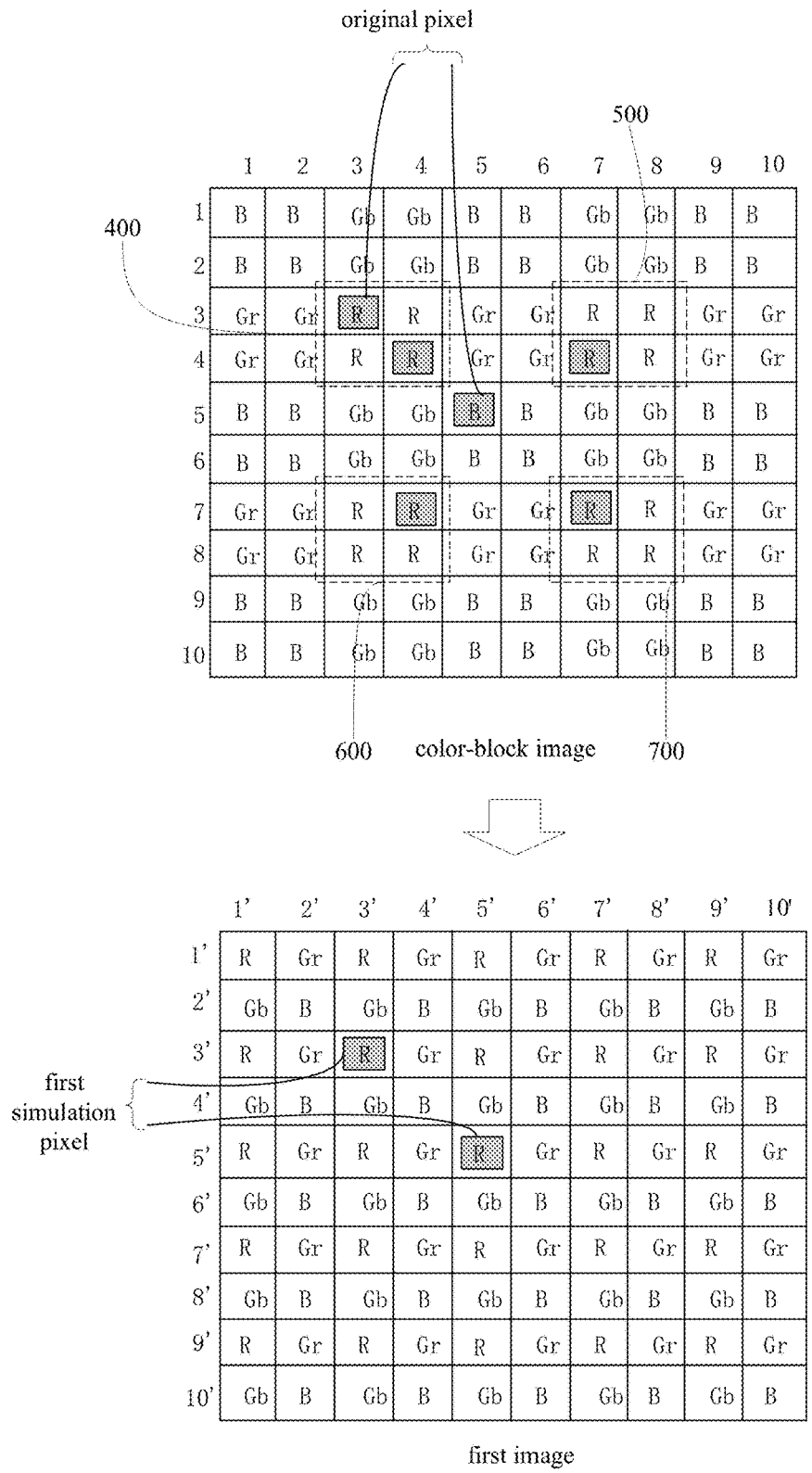
FIG. 10 is a schematic diagram illustrating a process of converting a part of color-block image into a first image according to an embodiment of the present disclosure.

For a frame of color-block image, the first part of the color-block is converted into a first image arranged in the Bayer array and is processed using the first interpolation algorithm. Referring to FIG. 10, for the first simulation pixels R3'3' and R5'5', the corresponding original pixels are R33 and B55.

When the first simulation pixel R3'3' is to be obtained, since the first simulation pixel R3'3' has the same color as the corresponding original pixel R33, the pixel value of the original pixel R33 is directly determined as the pixel value of the first simulation pixel R3'3' during conversion.

When the first simulation pixel R5'5' is to be obtained, since the first simulation pixel R5'5' has a color different from that of the corresponding original pixel B55, the pixel value of the original pixel B55 cannot be directly determined as the pixel value of the first simulation pixel R5'5', and it is required to calculate the pixel value of the first simulation pixel R5'5' according to an association pixel of the first simulation pixel R5'5' by a first interpolation algorithm.

It should be noted that, a pixel value of a pixel mentioned in the context should be understood in a broad sense as a color attribute value of the pixel, such as a color value.

The association pixel is selected from an association pixel unit. There may be more than one association pixel unit for each first simulation pixel, for example, there may be four association pixel units, in which the association pixel units have the same color as the first simulation pixel and are adjacent to the image pixel unit including the original pixel at the same position as the first simulation pixel.

It should be noted that, "adjacent" here should be understood in a broad sense. Take FIG. 10 as an example, the first simulation pixel R5'5' corresponds to the original pixel B55. The image pixel units 400, 500, 600 and 700 are selected as the association pixel units, but other red image pixel units far away from the image pixel unit where the original pixel B55 is located are not selected as the association pixel units. In each association pixel unit, the red original pixel closest to the original pixel B55 is selected as the association pixel, which means that the association pixels of the first simulation pixel R5'5' include the original pixels R44, R74, R47 and R77. The first simulation pixel R5'5' is adjacent to and has the same color as the original pixels R44, R74, R47 and R77.

In different cases, the original pixels are converted into the first simulation pixels in different manners. Therefore, the color-block image is converted into the first image. Since the filters in the Bayer array are adopted when shooting the image, the SNR of the image is improved. During the image processing procedure, the interpolation processing is performed on the color-block image, such that the distinguishability and resolution of the image can be improved.

Figure 11:
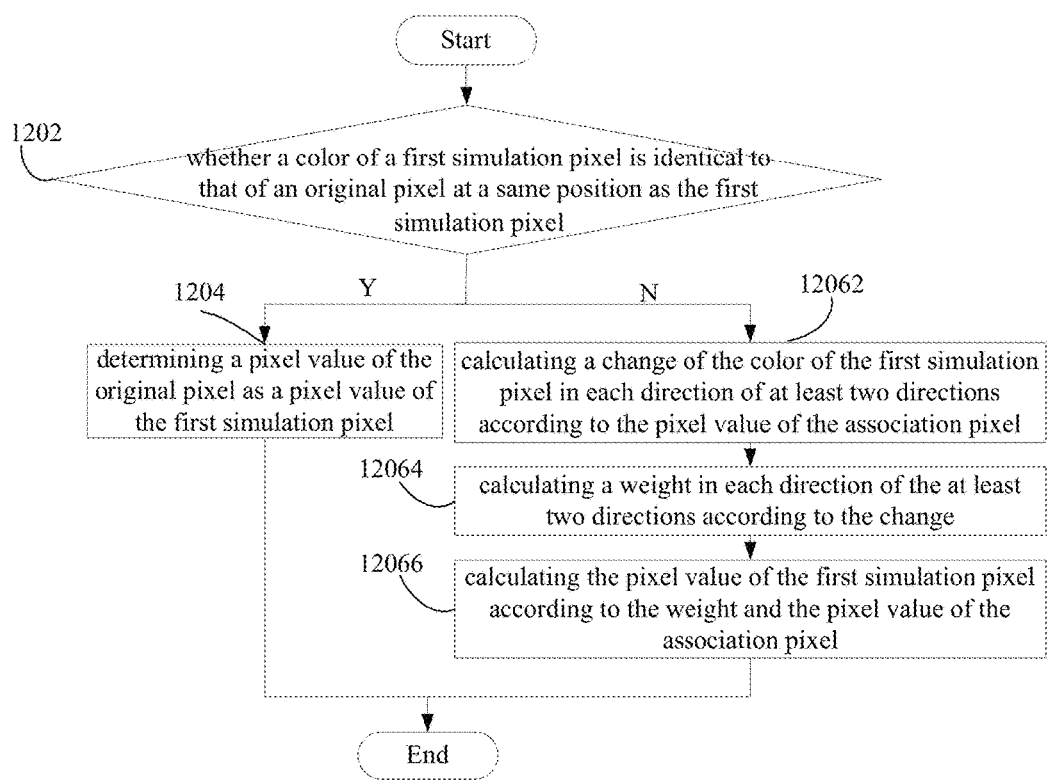
FIG. 11 is a flow chart illustrating a process of converting a part of the color-block image into a first image according to another embodiment of the present disclosure.

Referring to FIG. 11, in some implementations, the act at block 1206 (i.e., determining the pixel value of the first simulation pixel according to a pixel value of an association pixel) includes the following.

At block 12062, a change of the color of the first simulation pixel in each direction of at least two directions is calculated according to the pixel value of the association pixel.

At block 12064, a weight in each direction of the at least two directions is calculated according to the change.

At block 12066, the pixel value of the first simulation pixel is calculated according to the weight and the pixel value of the association pixel.

In detail, the first interpolation algorithm is realized as follows: with reference to energy changes of the image in different directions and according to weights of the association pixels in different directions, the pixel value of the first simulation pixel is calculated by a linear interpolation. From the direction having a smaller energy change, it can get a higher reference value, i.e., the weight for this direction in the interpolation is high.

In some examples, for sake of convenience, only the horizontal direction and the vertical direction are considered.

The pixel value of the first simulation pixel R5'5' is obtained by a first interpolation algorithm based on the original pixels R44, R74, R47 and R77. Since there is no original pixel with a same color as the first simulation pixel (i.e., R) in the horizontal direction and the vertical direction of the original pixel B55 corresponding the first simulation pixel R5'5', a component of this color (i.e., R) in each of the horizontal direction and the vertical direction is calculated according to the association pixels. The components in the horizontal direction are R45 and R75, the components in the vertical direction are R54 and R57. All the components can be calculated according to the original pixels R44, R74, R47 and R77.

In detail, R45=R44*⅔+R47*⅓, R75=⅔*R74+⅓*R77, R54=⅔*R44+⅓*R74, R57=⅔*R47+⅓*R77.

The change of color and the weight in each of the horizontal direction and the vertical direction are calculated respectively. In other words, according to the change of color in each direction, the reference weight in each direction used in the first interpolation algorithm is determined. The weight in the direction with a small change is high, while the weight in the direction with a big change is low. The change in the horizontal direction is X1=|R45−R75|. The change in the vertical direction is X2=|R54−R57|, W1=X1/(X1+X2), W2=X2/(X1+X2). After the above calculation, the pixel value of the first simulation pixel R5'5' can be calculated as R5'5'=(⅔*R45+⅓*R75)*W2+(⅔*R54+⅓*R57)*W1. It can be understood that, if X1>X2, then W1>W2. The weight in the horizontal direction is W2, and the weight in the vertical direction is W1, vice versa.

Accordingly, the pixel value of the first simulation pixel can be calculated by the first interpolation algorithm. After the calculations on the association pixels, the original pixels can be converted into the first simulation pixels arranged in the typical Bayer array. In other words, four adjacent first simulation pixels arranged in the 2-by-2 array include one red first simulation pixel, two green first simulation pixels and one blue first simulation pixel.

It should be noted that, the first interpolation algorithm is not limited to the above-mentioned method, in which only the pixel values of pixels with a same color as the first simulation pixel in the vertical direction and the horizontal direction are considered during calculating the pixel value of the first simulation pixel. In other embodiments, pixel values of pixels with other colors can also be considered.

Figure 12:
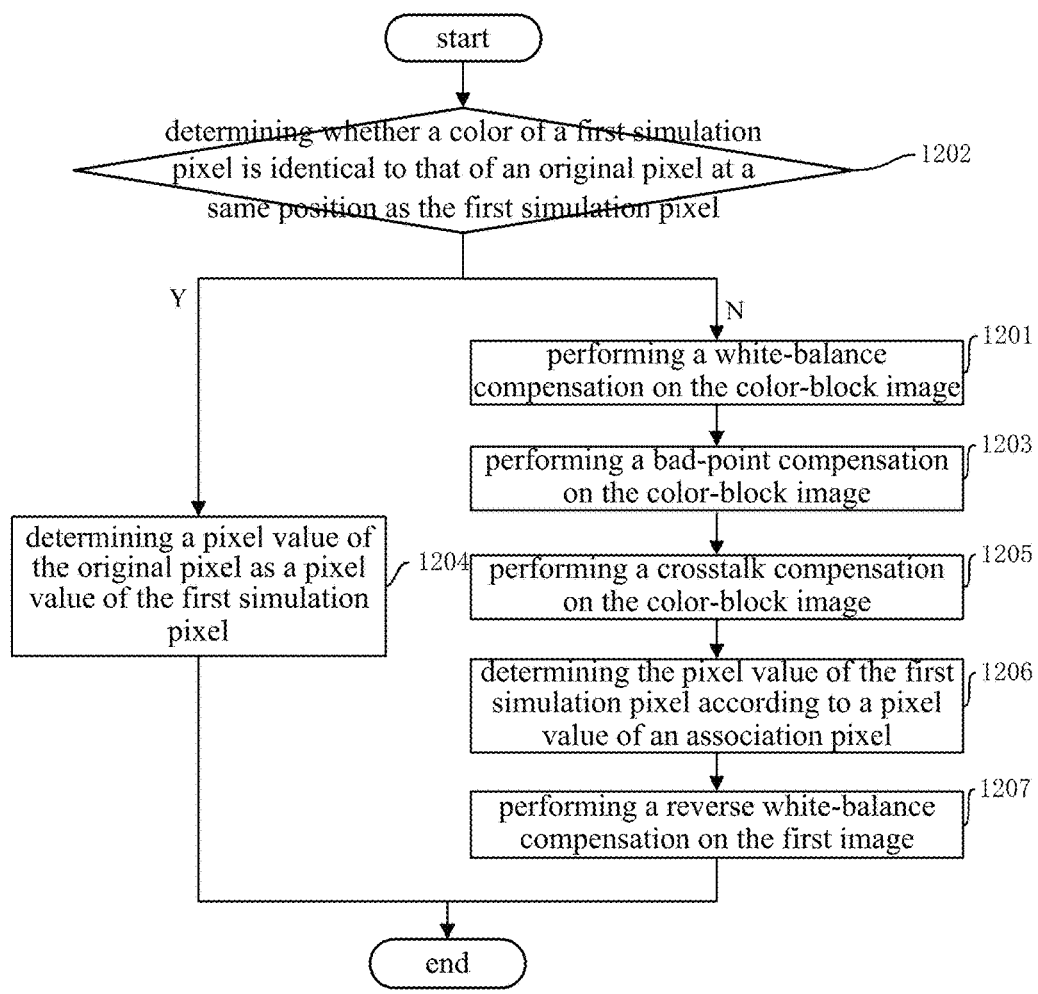
FIG. 12 is a flow chart illustrating a process of converting a part of the color-block image into a first image according to another embodiment of the present disclosure.

Referring to FIG. 12, in some embodiments, before the act at block 1206, the method further includes performing a white-balance compensation on the color-block image, as illustrated at block 1201.

Accordingly, after the act at block 1206, the method further includes performing a reverse white-balance compensation on the first image, as illustrated at block 1207.

In detail, in some examples, when converting the color-block image into the first image, during the interpolation, the red and blue first simulation pixels not only refer to the color weights of original pixels having the same color as the first simulation pixels, but also refer to the color weights of original pixels with the green color. Thus, it is required to perform the white-balance compensation before the interpolation to exclude an effect of the white-balance in the interpolation calculation. In order to avoid damaging the white-balance of the color-block image, it is required to perform the reverse white-balance compensation on the first image after the interpolation according to gain values of the red, green and blue colors in the compensation.

In this way, the effect of the white-balance in the interpolation calculation can be excluded, and the simulation image obtained after the interpolation can keep the white-balance of the color-block image.

Referring to FIG. 12 again, in some implementations, before the act at block 1206, the method further includes performing a bad-point compensation on the color-block image, as illustrated at block 1203.

It can be understood that, limited by the manufacturing process, there may be bad points in the image sensor 20. The bad point presents a same color all the time without varying with the photo-sensibility, which affects quality of the image. In order to ensure an accuracy of the interpolation and prevent from the effect of the bad points, it is required to perform the bad-point compensation before the interpolation.

In detail, during the bad-point compensation, the original pixels are detected. When an original pixel is detected as the bad point, the bad-point compensation is performed according to pixel values of other original pixels in the image pixel unit where the original pixel is located. In this way, the effect of the bad point on the interpolation can be avoided, thus improving the quality of the image.

Referring to FIG. 12 again, in some implementations, before the act at block 1206, the method includes performing a crosstalk compensation on the color-block image, as illustrated at block 1205.

In detail, four photosensitive pixels 2121 in one photosensitive pixel unit 212a are covered by the filters with the same color, and the photosensitive pixels 2121 have different photo-sensibilities, such that fixed spectrum noise may occur in pure-color areas in the first true-color image outputted after converting the first image, and the quality of the image may be affected. Therefore, it is required to perform the crosstalk compensation on the color-block image.

Figure 13:
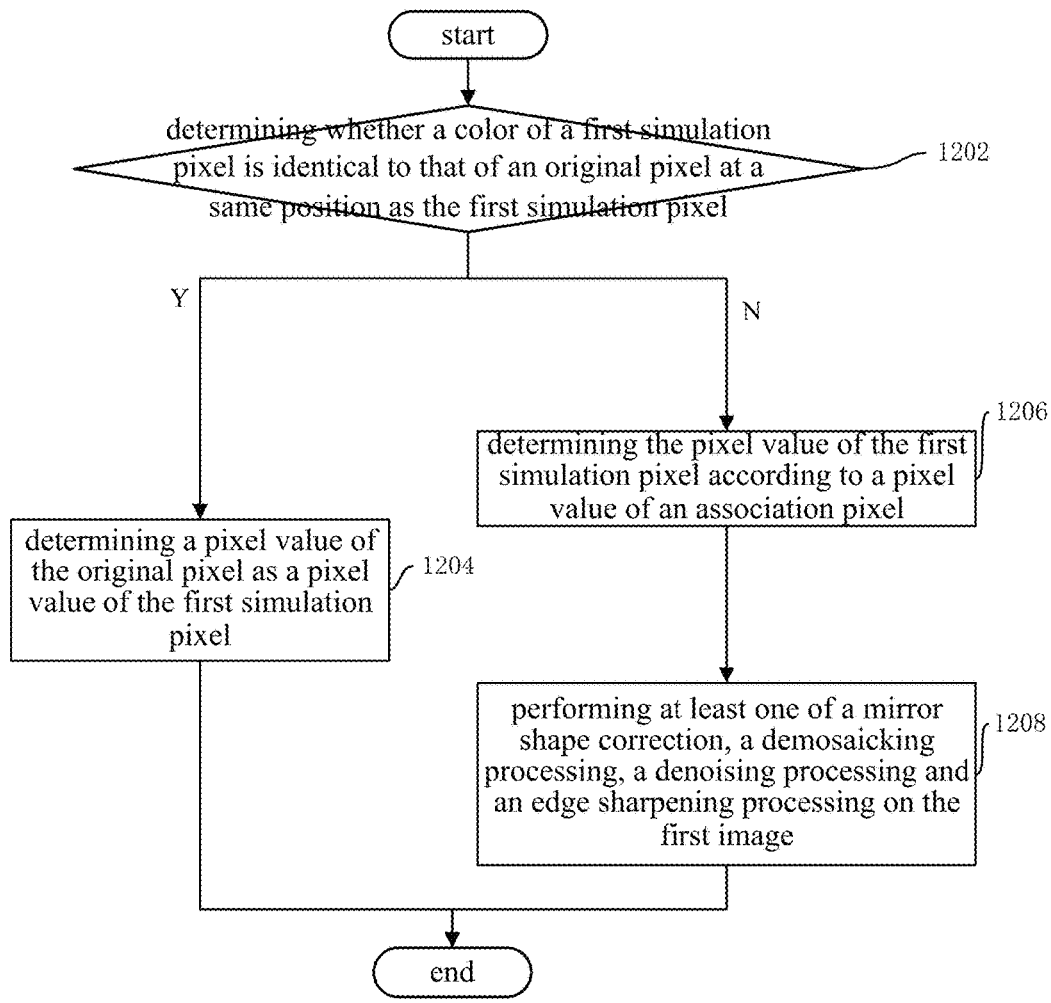
FIG. 13 is a flow chart illustrating a process of converting a part of the color-block image into a first image according to another embodiment of the present disclosure.

Referring to FIG. 13, in some implementations, after the act at block 1206, the method further includes performing at least one of a mirror shape correction, a demosaicking processing, a denoising processing and an edge sharpening processing on the first image, as illustrated at block 1208.

It can be understood that, after the color-block image is converted into the first image, the first simulation pixels are arranged in the typical Bayer array. The first image can be processed, during which, the mirror shape correction, the demosaicking processing, the denoising processing and the edge sharpening processing are included, such that the simulation true-color image can be obtained and output to the user.

In some implementations, the second part of the color-block image beyond the brightness area needs to be processed with the second interpolation algorithm, to convert the second part into a second image. The second image includes second simulation pixels arranged in an array, and each photosensitive pixel corresponds to one second simulation pixel. The second image may be obtained by the following. An average pixel value of each image pixel unit of the second part of the color-block image is calculated. It is determined whether a color of a second simulation pixel is identical to that of the original pixel at a same position as the second simulation pixel. When the color of the second simulation pixel is identical to that of the original pixel at the same position as the second simulation pixel, the average pixel value of an image pixel unit including the original pixel is determined as a pixel value of the second simulation pixel. When the color of the second simulation pixel is different from that of the original pixel at the same position as the second simulation pixel, an average pixel value of an image pixel unit with a same color as the second simulation pixel and closest to an image pixel unit including the original pixel is determined as the pixel value of the second simulation pixel.

Figure 14:
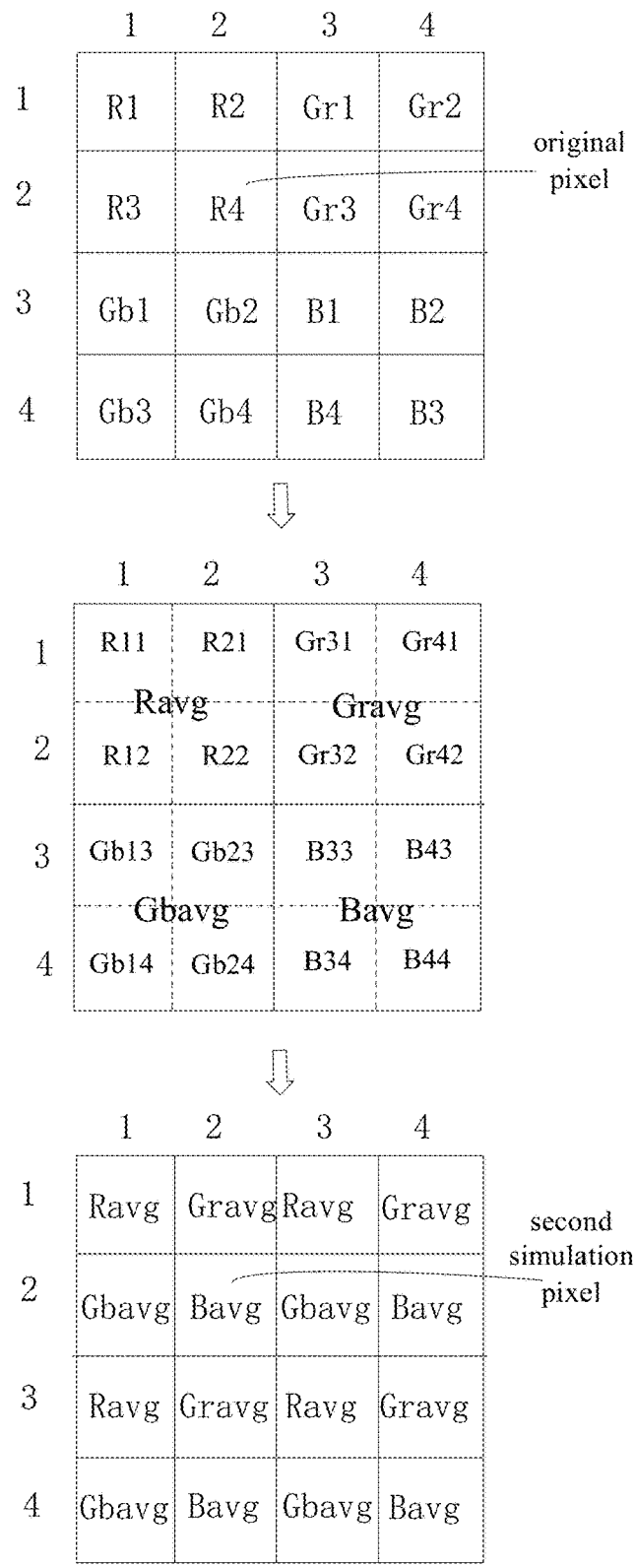
FIG. 14 is a schematic diagram illustrating a process of converting a color-block image into a second image according to an embodiment of the present disclosure.

Referring to FIG. 14, take FIG. 14 as an example to illustrate the second interpolation algorithm. The average pixel value of each image pixel unit is calculated as follows: $Ravg=(R1+R2+R3+R4)/4$, $Gravg=(Gr1+Gr2+Gr3+Gr4)/4$, $Gbavg=(Gb1+Gb2+Gb3+Gb4)/4$ and $Bavg=(B1+B2+B3+B4)/4$. The pixel value of each of the original pixels R11, R12, R13 and R14 is equal to Ravg. The pixel value of each of the original pixels Gr31, Gr32, Gr41 and Gr42 is equal to Gravg. The pixel value of each of the original pixels Gb13, Gb14, Gb23 and Gb24 is equal to Gbavg. The pixel value of each of the original pixels B33, B34, B43 and B44 is equal to Bavg. The second simulation pixel B22 is taken as an example, the corresponding original pixel having the same positon as the second simulation pixel B22 is R22. Since the color of the second simulation pixel B22 is different from that of the corresponding original pixel R22, the pixel value of the second simulation pixel B22 may be determined as the pixel value corresponding to the closest blue filter, i.e., the pixel value Bavg of any of original pixels B33, B34, B43 and B44. Similarly, the pixel values of second simulation pixels with other colors can be determined using the second interpolation algorithm.

For the second part of the color-block image beyond the brightness area, the second interpolation algorithm is used to convert the original pixels into the second simulation pixels. Thus, the color-block image is converted into the simulation image. The second interpolation algorithm has a time complexity and a space complexity less than those of the first interpolation algorithm. Thus, using the second interpolation algorithm to process the second part of the color-block beyond the brightness area, the computing time consumed is reduced, thereby improving the user experience.

In another aspect, the present disclosure also provides an image processing apparatus.

Figure 15:
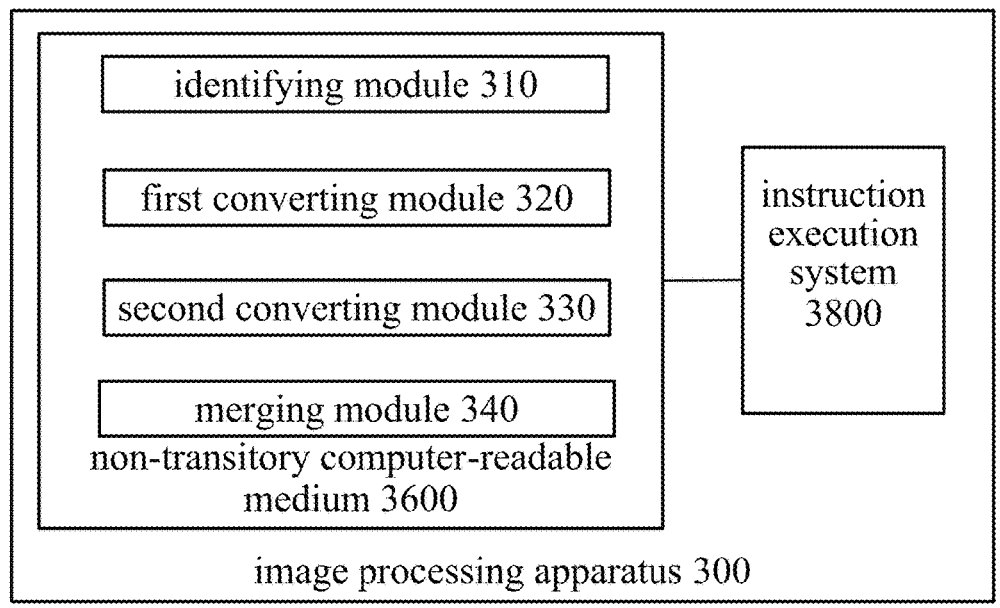
FIG. 15 is a block diagram of an image processing apparatus according to an embodiment of the present disclosure.

FIG. 15 is a block diagram of an image processing apparatus according to an embodiment of the present disclosure. Referring to FIG. 15, an image processing apparatus 300 is illustrated. The image processing apparatus 300 is applied in an electronic device and is configured to process a color-block image output by an image sensor 20. As illustrated above in FIGS. 2-3 and 5-6, the image sensor 20 includes an array 212 of photosensitive pixel units and an array 211 of filter units arranged on the array 212 of photosensitive pixel units. Each filter unit 211a corresponds to one photosensitive pixel unit 212a, and each photosensitive pixel unit 212a includes a plurality of photosensitive pixels 2121. The color-block image includes image pixel units arranged in a preset array, and each image pixel unit includes a plurality of original pixels. Each photosensitive pixel unit 212a corresponds to one image pixel unit, and each photosensitive pixel 2121 corresponds to one original pixel. The image processing apparatus 300 includes a non-transitory computer-readable medium 3600 and an instruction execution system 3800. The non-transitory computer-readable medium 3600 includes computer-executable instructions stored thereon. The instruction execution system 3800 is configured by the instructions stored in the medium 3600 to implement at least one of an identifying module 310, a first converting module 320, a second converting module 330 and a merging module 340.

The identifying module 310 is configured to identify a brightness area in the color-block image. The first converting module 320 is configured to convert a first part of color-block image within the brightness area into a first image using a first interpolation algorithm. The first image includes first simulation pixels arranged in an array, and each photosensitive pixel corresponds to one first simulation pixel. The second converting module 330 is configured to convert a second part of the color-block image beyond the brightness area into a second image using a second interpolation algorithm. The second image includes second simulation pixels arranged in an array, and each photosensitive pixel corresponds to one second simulation pixel. The first interpolation algorithm is more complex than the second interpolation algorithm. The merging module 340 is configured to merge the first image and the second image to generate a simulation image corresponding to the color-block image.

In other words, the act at block 110 can be implemented by the identifying module 310. The act at block 120 can be implemented by the first converting module 320. The act at block 130 can be implemented by the second converting module 330. The act at block 140 can be implemented by the merging module 340.

Figure 16:
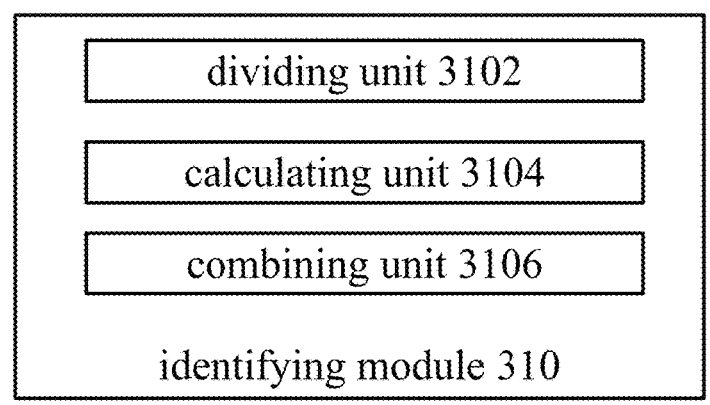
FIG. 16 is a block diagram of an identifying module according to an embodiment of the present disclosure.

Referring to FIG. 16, the identifying module 310 includes a dividing unit 3102, a calculating unit 3104, and a combining unit 3106. The dividing unit 3102 is configured to divide the color-block image into a plurality of analysis areas. The calculating unit 3104 is configured to calculate a brightness value for each analysis area. The combining unit 3106 is configured to combine the analysis areas each with the brightness value greater than a preset threshold as the brightness area.

In other words, the act at block 1101 can be implemented by the dividing unit 3102. The act at block 1102 can be implemented by the calculating unit 3104. The act at block 1103 can be implemented by the combining unit 3106.

In some implementations, the plurality of analysis areas are arranged in an array.

Figure 17:
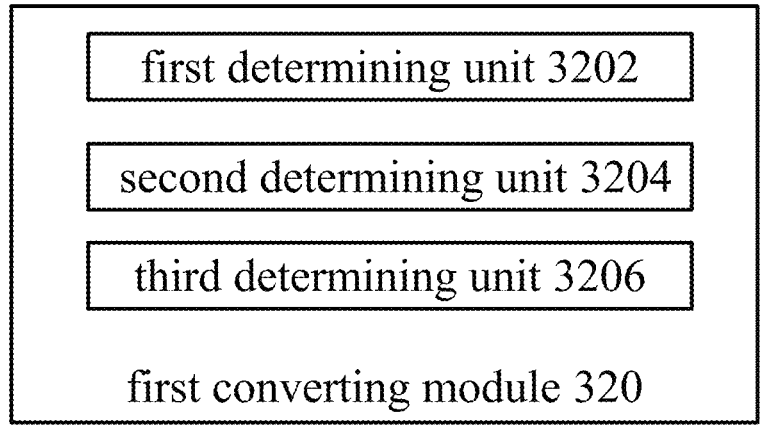
FIG. 17 is a block diagram of a first converting module according to an embodiment of the present disclosure.

Referring to FIG. 17, in some implementations, the first converting module 320 includes a first determining unit 3202, a second determining unit 3204 and a third determining unit 3206. The first determining unit 3202 is configured to determine whether a color of a first simulation pixel is identical to that of an original pixel at a same position as the first simulation pixel. The second determining unit 3204 is configured to determine a pixel value of the original pixel as a pixel value of the first simulation pixel, when the color of the first simulation pixel is identical to that of the original pixel at the same position as the first simulation pixel. The third determining unit 3206 is configured to determine the pixel value of the first simulation pixel according to a pixel value of an association pixel, when the color of the first simulation pixel is different from that of the original pixel at the same position as the first simulation pixel, in which the association pixel is selected from an image pixel unit with a same color as the first simulation pixel and adjacent to an image pixel unit including the original pixel.

In other words, the act at block 1202 can be implemented by the first determining unit 3202. The act at block 1204 can be implemented by the second determining unit 3204. The act at block 1206 can be implemented by the third determining unit 3206.

Figure 18:
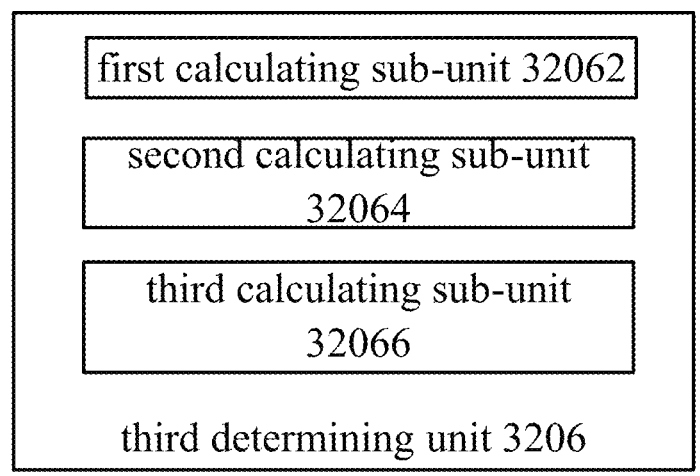
FIG. 18 is a block diagram of a third determining unit in the first converting module according to an embodiment of the present disclosure.

Referring to FIG. 18, the third determining unit 3206 includes a first calculating sub-unit 32062, a second calculating sub-unit 32064 and a third calculating sub-unit 32066. The first calculating sub-unit 32062 is configured to calculate a change of the color of the first simulation pixel in each direction of at least two directions according to the pixel value of the association pixel. The second calculating sub-unit 32064 is configured to calculate a weight in each direction of the at least two directions according to the change. The third calculating sub-unit 32066 is configured to calculate the pixel value of the first simulation pixel according to the weight and the pixel value of the association pixel.

In other words, the act at block 12062 can be implemented by the first calculating sub-unit 32062. The act at block 12064 can be implemented by the second calculating sub-unit 32064. The act at block 12066 can be implemented by the third calculating sub-unit 32066.

Figure 19:
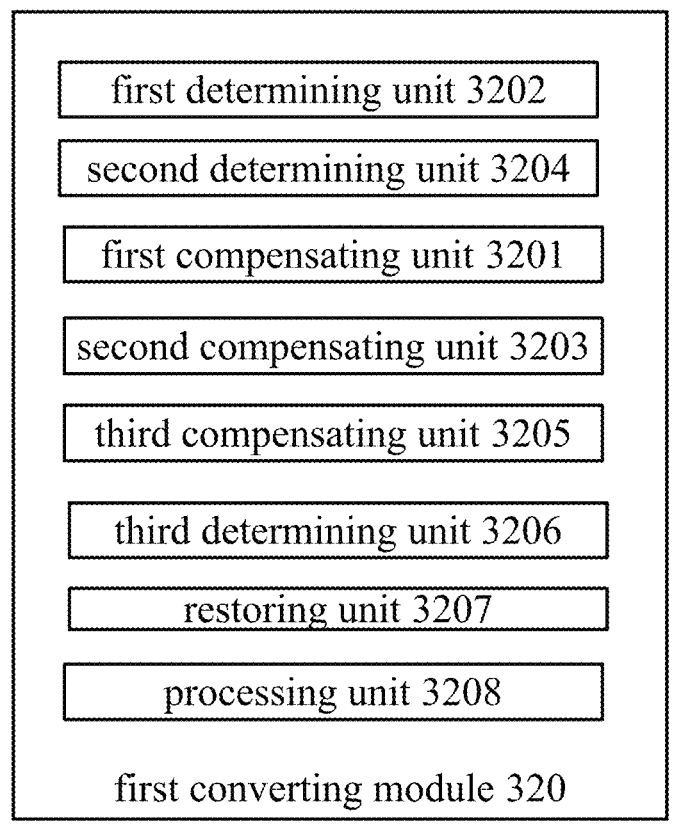
FIG. 19 is a block diagram of a first converting module according to another embodiment of the present disclosure.

Referring to FIG. 19, in some implementations, the first converting module 320 further includes a first compensating unit 3201 and a restoring unit 3207. The first compensating unit 3201 is configured to perform a white-balance compensation on the color-block image before the color-block image is converted into the simulation image. The restoring module 3207 is configured to perform a reverse white-balance compensation on the simulation image.

In other words, the act at block 1201 can be implemented by the first compensating unit 3201, and the act at block 1207 can be implemented by the restoring unit 3207.

Referring to FIG. 19 again, in some implementations, the first converting module 320 further includes a second compensating unit 3203 and a third compensating unit 3205. The second compensating unit 3203 is configured to perform at least one of a bad-point compensation and a crosstalk compensation on the color-block image. The third compensation unit 3205 is configured to perform a crosstalk compensation on the color-block image. In other words, the act at block 1203 can be implemented by the second compensating unit 3203. The act at block 1205 can be implemented by the third compensating unit 3205.

Referring to FIG. 19 again, in some implementations, the first converting module 320 further includes a processing unit 3208. The processing unit 3108 is configured to perform at least one of a mirror shape correction, a demosaicking processing, a denoising processing and an edge sharpening processing on the simulation image. In other words, the act at block 1208 can be implemented by the third processing unit 3208.

The present disclosure also provides an electronic device.

Figure 20:
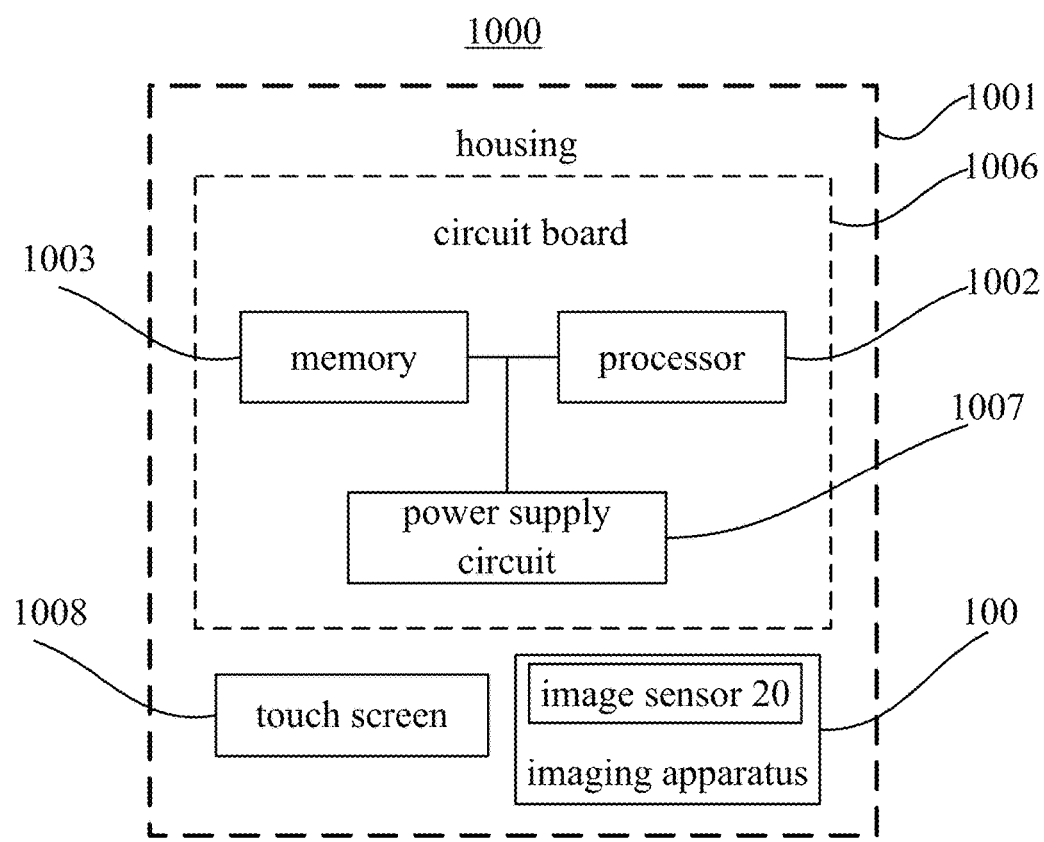
FIG. 20 is a block diagram of an electronic device according to an embodiment of the present disclosure.

FIG. 20 is a block diagram of an electronic device 1000 according to an embodiment of the present disclosure.

Referring to FIG. 20, the electronic device 1000 of the present disclosure includes a housing 1001, a processor 1002, a memory 1003, a circuit board 1006, a power supply circuit 1007, and an imaging apparatus 100. The circuit board 1006 is enclosed by the housing 1001. The processor 1002 and the memory 1003 are positioned on the circuit board 1006. The power supply circuit 1007 is configured to provide power for respective circuits or components of the electronic device 1000. The memory 1003 is configured to store executable program codes. The imaging apparatus 100 includes an image sensor 20. As illustrated above, the image sensor 20 includes an array 212 of photosensitive pixel units and an array 211 of filter units arranged on the array 212 of photosensitive pixel units. Each filter unit 211a corresponds to one photosensitive pixel unit 212a, and each photosensitive pixel unit 212a includes a plurality of photosensitive pixels 2121.

The processor 1002 is configured to run a program corresponding to the executable program codes by reading the executable program codes stored in the memory 1003, to perform following operations. A brightness area is identified in the color-block image. A first part of the color-block image within the brightness area is converted into a first image using a first interpolation algorithm. The first image includes first simulation pixels arranged in an array, and each photosensitive pixel corresponds to one first simulation pixel. A second part of the color-block image beyond the brightness area is converted into a second image using a second interpolation algorithm. The second image includes second simulation pixels arranged in an array, each photosensitive pixel corresponds to one second simulation pixel. The first interpolation algorithm is more complex than the second interpolation algorithm. The first image and the second image are merged to generate a simulation image corresponding to the color-block image. In some embodiments, the electronic device 1000 may include a touch screen 1008.

In some implementations, the processor 1002 is configured to run a program corresponding to the executable program codes by reading the executable program codes stored in the memory 1003, to identify the brightness by acts of: dividing the color-block image into a plurality of analysis areas; calculating a brightness value for each analysis area; and combining the analysis areas each with the brightness value greater than a preset threshold as the brightness area.

In some implementations, the processor 1002 is configured to run a program corresponding to the executable program codes by reading the executable program codes stored in the memory 1003, to convert the first part of the color-block image within the brightness area into the first image using the first interpolation algorithm by acts of: determining whether a color of a first simulation pixel is identical to that of an original pixel at a same position as the first simulation pixel; when the color of the first simulation pixel is identical to that of the original pixel at the same position as the first simulation pixel, determining a pixel value of the original pixel as a pixel value of the first simulation pixel; and when the color of the first simulation pixel is different from that of the original pixel at the same position as the first simulation pixel, determining the pixel value of the first simulation pixel according to a pixel value of an association pixel, in which the association pixel is selected from an image pixel unit with a same color as the first simulation pixel and adjacent to an image pixel unit including the original pixel.

In some implementations, the processor 1002 is configured to run a program corresponding to the executable program codes by reading the executable program codes stored in the memory 1003, to determine the pixel value of the first simulation pixel according to the pixel value of the association pixel by acts of: calculating a change of the color of the first simulation pixel in each direction of at least two directions according to the pixel value of the association pixel; calculating a weight in each direction of the at least two directions according to the change; and calculating the pixel value of the first simulation pixel according to the weight and the pixel value of the association pixel.

In some implementations, the processor 1002 is configured to run a program corresponding to the executable program codes by reading the executable program codes stored in the memory 1003, to perform following operations: performing a white-balance compensation on the color-block image before the color-block image is converted; and performing a reverse white-balance compensation on the simulation image after the simulation image is acquired.

In some implementations, the processor 1002 is configured to run a program corresponding to the executable program codes by reading the executable program codes stored in the memory 1003, to perform following operation: performing at least one of a bad-point compensation and a crosstalk compensation on the color-block image.

In some implementations, the processor 1002 is configured to run a program corresponding to the executable program codes by reading the executable program codes stored in the memory 1003, to perform following operations: performing at least one of a mirror shape correction, a demosaicking processing, a denoising processing and an edge sharpening processing on the simulation image.

In some implementations, the imaging apparatus includes a front camera or a real camera (not illustrated in FIG. 20).

It may be understood that, electronic device 1000 generally includes both of the front camera and the rear camera. Images captured by the front camera and the rear camera may be processed with the image processing method according to embodiments of the present disclosure, thus improving the user experience.

In some implementations, the electronic device may be a mobile phone or a tablet computer, which is not limited herein.

The mobile phone and the tablet computer both include an imaging apparatus 100. When the mobile phone or the tablet computer is used to capture an image, the image may be processed with the image processing method according to embodiments of the present disclosure, so as to improve the distinguishability and the resolution of the image.

It may be understood that, other electronic device having a capacity of capturing images may be included.

The electronic device 1000 may further include an inputting component (not illustrated in FIG. 20). It should be understood that, the inputting component may further include one or more of the following: an inputting interface, a physical button of the electronic device 1000, a microphone, etc.

It should be understood that, the electronic device 1000 may further include one or more of the following components (not illustrated in FIG. 20): an audio component, an input/output (I/O) interface, a sensor component and a communication component. The audio component is configured to output and/or input audio signals, for example, the audio component includes a microphone. The I/O interface is configured to provide an interface between the processor 1002 and peripheral interface modules. The sensor component includes one or more sensors to provide status assessments of various aspects of the electronic device 1000. The communication component is configured to facilitate communication, wired or wirelessly, between the electronic device 1000 and other devices.

It is to be understood that phraseology and terminology used herein with reference to device or element orientation (such as, terms like "center", "longitudinal", "lateral", "length", "width", "height", "up", "down", "front", "rear", "left", "right", "vertical", "horizontal", "top", "bottom", "inside", "outside", "clockwise", "anticlockwise", "axial", "radial", "circumferential") are only used to simplify description of the present invention, and do not indicate or imply that the device or element referred to must have or operated in a particular orientation. They cannot be seen as limits to the present disclosure.

Moreover, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or interactions of two elements, which can be understood by those skilled in the art according to specific situations.

In the present disclosure, unless specified or limited otherwise, a structure in which a first feature is "on" a second feature may include an embodiment in which the first feature directly contacts the second feature, and may also include an embodiment in which the first feature indirectly contacts the second feature via an intermediate medium. Moreover, a structure in which a first feature is "on", "over" or "above" a second feature may indicate that the first feature is right above the second feature or obliquely above the second feature, or just indicate that a horizontal level of the first feature is higher than the second feature. A structure in which a first feature is "below", or "under" a second feature may indicate that the first feature is right under the second feature or obliquely under the second feature, or just indicate that a horizontal level of the first feature is lower than the second feature.

Various embodiments and examples are provided in the following description to implement different structures of the present disclosure. In order to simplify the present disclosure, certain elements and settings will be described. However, these elements and settings are only examples and are not intended to limit the present disclosure. In addition, reference numerals may be repeated in different examples in the disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. An image processing method, configured to process a color-block image output by an image sensor, wherein the image sensor comprises an array of photosensitive pixel units, each photosensitive pixel unit comprises a plurality of photosensitive pixels; the color-block image comprises image pixel units arranged in a preset array, each image pixel unit comprises a plurality of original pixels, each photosensitive pixel unit corresponds to one image pixel unit, and each photosensitive pixel corresponds to one original pixel; the image processing method comprises:

identifying a brightness area in the color-block image;

converting a first part of the color-block image within the brightness area into a first image using a first interpolation algorithm, wherein, the first image comprises first simulation pixels arranged in an array, and each photosensitive pixel corresponds to one first simulation pixel;

converting a second part of the color-block image beyond the brightness area into a second image using a second interpolation algorithm, wherein, the second image comprises second simulation pixels arranged in an array, each photosensitive pixel corresponds to one second simulation pixel, and a complexity of the first interpolation algorithm is greater than that of the second interpolation algorithm; and merging the first image and the second image to generate a simulation image corresponding to the color-block image;

wherein converting the first part of the color-block image within the brightness area into the first image using the first interpolation algorithm comprises:

determining whether a color of a first simulation pixel is identical to that of an original pixel at a same position as the first simulation pixel, when the color of the first simulation pixel is identical to that of the original pixel at the same position as the first simulation pixel, determining a pixel value of the original pixel as a pixel value of the first simulation pixel, and when the color of the first simulation pixel is different from that of the original pixel at the same position as the first simulation pixel, determining the pixel value of the first simulation pixel according to a pixel value of an association pixel, wherein the association pixel is selected from an image pixel unit with a same color as the first simulation pixel and adjacent to an image pixel unit comprising the original pixel.

2. The image processing method according to claim 1, wherein identifying the brightness area in the color-block image comprises:
  dividing the color-block image into a plurality of analysis areas;
  calculating a brightness value for each analysis area; and
  combining the analysis areas each with the brightness value greater than a preset threshold as the brightness area.

3. The image processing method according to claim 1, wherein determining the pixel value of the first simulation pixel according to the pixel value of the association pixel comprises:
  calculating a change of the color of the first simulation pixel in each direction of at least two directions according to the pixel value of the association pixel;
  calculating a weight in each direction of the at least two directions according to the change; and
  calculating the pixel value of the first simulation pixel according to the weight and the pixel value of the association pixel.

4. The image processing method according to claim 1, wherein the preset array comprises a Bayer array.

5. The image processing method according to claim 1, wherein the image pixel unit comprises original pixels arranged in a 2-by-2 array.

6. The image processing method according to claim 1, further comprising:
  performing a white-balance compensation on the color-block image; and
  performing a reverse white-balance compensation on the simulation image.

7. The image processing method according to claim 1, further comprising:
  performing at least one of a bad-point compensation and a crosstalk compensation on the color-block image.

8. The image processing method according to claim 1, further comprising:
  performing at least one of a mirror shape correction, a demosaicking processing, a denoising processing and an edge sharpening processing on the simulation image.

9. An image processing apparatus, configured to process a color-block image output by an image sensor, wherein the image sensor comprises an array of photosensitive pixel units, each photosensitive pixel unit comprises a plurality of photosensitive pixels; the color-block image comprises image pixel units arranged in a preset array, each image pixel unit comprises a plurality of original pixels, each photosensitive pixel unit corresponds to one image pixel unit, and each photosensitive pixel corresponds to one original pixel; the image processing apparatus comprises a non-transitory computer-readable medium comprising computer-executable instructions stored thereon, and an instruction execution system which is configured by the instructions to implement at least one of:
  an identifying module, configured to identify a brightness area in the color-block image;
  a first converting module, configured to convert a first part of the color-block image within the brightness area into a first image using a first interpolation algorithm, wherein, the first image comprises first simulation pixels arranged in an array and each photosensitive pixel corresponds to one first simulation pixel;
  a second converting module, configured to convert a second part of the color-block image beyond the brightness area into a second image using a second interpolation algorithm, wherein, the second image comprises second simulation pixels arranged in an array, each photosensitive pixel corresponds to one second simulation pixel, and a complexity of the first interpolation algorithm is greater than that of the second interpolation algorithm; and
  a merging module, configured to merge the first image and the second image to generate a simulation image corresponding to the color-block image;
  wherein the first converting module comprises:
  a first determining unit, configured to determine whether a color of a first simulation pixel is identical to that of an original pixel at a same position as the first simulation pixel,
  a second determining unit, configured to determine a pixel value of the original pixel as a pixel value of the first simulation pixel, when the color of the first simulation pixel is identical to that of the original pixel at the same position as the first simulation pixel, and
  a third determining unit, configured to determine the pixel value of the first simulation pixel according to a pixel value of an association pixel when the color of the first simulation pixel is different from that of the original pixel at the same position as the first simulation pixel, wherein the association pixel is selected from an image pixel unit with a same color as the first simulation pixel and adjacent to an image pixel unit comprising the original pixel.

10. The image processing apparatus according to claim 9, wherein the identifying module comprises:
  a dividing unit, configured to divide the color-block image into a plurality of analysis areas;
  a calculating unit, configured to calculate a brightness value for each analysis area; and
  a combining unit, configured to combine the analysis areas each with the brightness value greater than a preset threshold as the brightness area.

11. The image processing apparatus according to claim 10, wherein the plurality of analysis areas are arranged in an array.

12. The image processing apparatus according to claim 9, wherein the third determining unit comprises:
  a first calculating sub-unit, configured to calculate a change of the color of the first simulation pixel in each direction of at least two directions according to the pixel value of the association pixel;
  a second calculating sub-unit, configured to calculate a weight in each direction of the at least two directions according to the change; and
  a third calculating sub-unit, configured to calculate the pixel value of the first simulation pixel according to the weight and the pixel value of the association pixel.

13. The image processing apparatus according to claim 9, wherein the preset array comprises a Bayer array.

14. The image processing apparatus according to claim 9, wherein the image pixel unit comprises original pixels arranged in a 2-by-2 array.

15. The image processing apparatus according to claim 9, wherein the first converting module comprises:
   a first compensating unit, configured to perform a white-balance compensation on the color-block image; and
   a restoring unit, configured to perform a reverse white-balance compensation on the simulation image.

16. The image processing apparatus according to claim 9, wherein the first converting module comprises at least one of a second compensating unit and a third compensating unit; wherein:
   the second compensating unit is configured to perform a bad-point compensation on the color-block image; and
   the third compensating unit is configured to perform a crosstalk compensation on the color-block image.

17. The image processing apparatus according to claim 9, wherein the first converting module comprises:
   a processing unit, configured to perform at least one of a mirror shape correction, a demosaicking processing, a denoising processing and an edge sharpening processing on the simulation image.

18. An electronic device, comprising a housing, a processor, a memory, a circuit board, a power supply circuit, and an imaging apparatus, wherein the circuit board is enclosed by the housing;
   the processor and the memory are positioned on the circuit board;
   the power supply circuit is configured to provide power for respective circuits or components of the electronic device;
   the imaging apparatus comprises an image sensor, wherein the image sensor is configured to output a color-block image and comprises an array of photosensitive pixel units, each photosensitive pixel unit comprises a plurality of photosensitive pixels; the color-block image comprises image pixel units arranged in a preset array, each image pixel unit comprises a plurality of original pixels, each photosensitive pixel unit corresponds to one image pixel unit, and each photosensitive pixel corresponds to one original pixel;
   the memory is configured to store executable program codes; and
   the processor is configured to run a program corresponding to the executable program codes by reading the executable program codes stored in the memory, to perform following operations:
identifying a brightness area in the color-block image;
converting a first part of the color-block image within the brightness area into a first image using a first interpolation algorithm, wherein, the first image comprises first simulation pixels arranged in an array, and each photosensitive pixel corresponds to one first simulation pixel;
converting a second part of the color-block image beyond the brightness area into a second image using a second interpolation algorithm, wherein, the second image comprises second simulation pixels arranged in an array, each photosensitive pixel corresponds to one second simulation pixel, and a complexity of the first interpolation algorithm is greater than that of the second interpolation algorithm; and
merging the first image and the second image to generate a simulation image corresponding to the color-block image;
wherein converting the first part of the color-block image within the brightness area into the first image using the first interpolation algorithm comprises:
determining whether a color of a first simulation pixel is identical to that of an original pixel at a same position as the first simulation pixel,
when the color of the first simulation pixel is identical to that of the original pixel at the same position as the first simulation pixel, determining a pixel value of the original pixel as a pixel value of the first simulation pixel, and
when the color of the first simulation pixel is different from that of the original pixel at the same position as the first simulation pixel, determining the pixel value of the first simulation pixel according to a pixel value of an association pixel, wherein the association pixel is selected from an image pixel unit with a same color as the first simulation pixel and adjacent to an image pixel unit comprising the original pixel.

* * * * *